United States Patent
Aronson (10) Patent No.: US 8,244,085 B2
(45) Date of Patent: Aug. 14, 2012

(54) OPTICAL TRANSCEIVER INTERFACE FOR MULTIMODE FIBERS

(75) Inventor: Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 87 days.

(21) Appl. No.: 10/960,796

(22) Filed: Oct. 7, 2004

(65) Prior Publication Data
US 2006/0002667 A1  Jan. 5, 2006

Related U.S. Application Data

(60) Provisional application No. 60/585,216, filed on Jul. 2, 2004.

(51) Int. Cl.
*G02B 6/34* (2006.01)
(52) U.S. Cl. ......................................................... 385/37
(58) Field of Classification Search ...................... 385/37
See application file for complete search history.

(56) References Cited

U.S. PATENT DOCUMENTS

| | | | |
|---|---|---|---|
| 6,349,159 B1 | 2/2002 | Uebbing et al. | |
| 6,530,697 B1 | 3/2003 | Johnson et al. | |
| 6,741,777 B2 * | 5/2004 | Jewell et al. | 385/49 |
| 7,221,823 B2 * | 5/2007 | Kathman et al. | 385/33 |
| 2003/0142903 A1 | 7/2003 | Johnson et al. | |
| 2005/0025420 A1 | 2/2005 | Farr | |

OTHER PUBLICATIONS

10 Gigabit Small Form Factor Pluggable Module, Revision 4.0, published by the XFP Multi Source Agreement (MSA) Group on Apr. 13, 2004 (xfpmsa.org).

* cited by examiner

*Primary Examiner* — Timothy L Rude
(74) *Attorney, Agent, or Firm* — Maschoff Gilmore & Israelsen (57) ABSTRACT

Systems and devices using diffractive and optionally refractive elements to launch an optical signal with a controlled amplitude and phase distribution into a multimode optical fiber for improved modal dispersion are provided. More particularly, optical ports, transmitter optical subassemblies (TOSAs), and transceivers use integrated diffractive and optionally refractive elements to launch a helically propagating light distribution, also known as a vortex launch. One embodiment includes a monolithic transparent port that generally includes: a lens on a first surface for receiving and collimating or focusing an optical signal; and a diffractive surface pattern for receiving the optical signal from the lens and launching the optical signal into a multimode optical fiber with a controlled intensity and phase distribution. Alternatively, the lens can be added as a separated component or omitted altogether while the diffractive surface pattern is formed on either the laser or fiber receptacle sides of the port.

28 Claims, 4 Drawing Sheets

OPTICAL TRANSCEIVER INTERFACE FOR MULTIMODE FIBERS

CROSS-REFERENCE TO RELATED APPLICATIONS

This application claims the benefit of U.S. Provisional Application No. 60/585,216, filed Jul. 2, 2004, which is incorporated by reference herein in its entireties.

BACKGROUND OF THE INVENTION

1. The Field of the Invention

The present invention relates to the field of optical communications. More particularly, the present invention relates to systems and methods using diffractive and optionally refractive surfaces to launch an optical signal into a multimode optical fiber with a controlled spatial intensity and phase profile.

2. The Relevant Technology

Computer and data communications networks continue to develop and expand due to declining costs, improved performance of computer and networking equipment, the remarkable growth of the internet, and the resulting increased demand for communication bandwidth. Such increased demand occurs within and between metropolitan areas as well as within communications networks. Moreover, as organizations have recognized the economic benefits of using communications networks, network applications such as electronic mail, voice and data transfer, host access, and shared and distributed databases are increasingly used as a means to increase user productivity. This increased demand translates into a need for higher speed communications links for which fiber optics is particularly well suited.

Through fiber optics, digital data in the form of light signals is formed by light emitting diodes or lasers and then propagated through a fiber optic cable. Such light signals allow for high data transmission rates over distances for which electrical links are poorly suited. Other advantages of using light signals for data transmission include their resistance to electro-magnetic radiation that interferes with electrical signals; fiber optic cables' ability to prevent light signals from escaping, as can occur with electrical signals in wire-based systems; and light signals' ability to be transmitted over great distances without the signal loss typically associated with electrical signals on copper wire.

One important device for fiber optic communications is the laser. Generally, a laser is a light source that produces, through stimulated emission, coherent, near monochromatic light. The emitted laser light can be modulated to provide optical signals that can be transmitted over great distances. In this manner, an electrical signal is converted to an optical signal for data transmission. The optical signal is, in turn, received and converted back to an electrical signal by a receiver such as a monitor photodiode. A transceiver is an optical device that includes both a laser (as part of a transmitter) and a photodiode (as part of a receiver).

The optical signal can be coupled to and from either multimode or single-mode fiber. The term "mode" refers to an electromagnetic wave traveling in a fiber or other waveguide which has a particular spatial field and phase distribution and which travels at a characteristic velocity. A small core optical fiber, for example 8-9 microns, can carry only a single-mode and is therefore termed single-mode fiber. Such a fiber is well suited for large transmission distances because all of the light travels with a well defined velocity. A larger core diameter fiber, for example 62.5 microns, can propagate more than one mode of light and is therefore termed multimode fiber. Multimode fiber is best suited to shorter transmission distances, for example within local area networks systems, while single-mode fiber is best suited to longer transmission distances such as long-distance telephony and cable television systems.

Single mode fiber has advantages in that single-mode fiber allows for a higher bandwidth-distance capacity to transmit information because it can retain the fidelity of each light pulse over longer distances and it exhibits no dispersion caused by velocity differences between multiple modes. Single-mode fiber also enjoys lower fiber attenuation than multimode fiber. Thus, more information can be transmitted per unit of time. As a result, single mode is often preferred for optical communications. Nevertheless, multimode fiber has some advantages that caused it to be used in a large number of shorter distance applications, generally less than 2 km and usually less than 500 m. Such distances form the majority of connections in local area networks (LANs) and similar storage area networks (SANs). First, earlier fiber optic links at relatively low data rates of 100 Mb/s or less were based on very low cost LED (light emitting diode) sources. The highly multimode nature of a typical LED's output makes it impossible to couple a useful portion of the light into a single mode fiber. Thus, relatively large core (50-62.5 um diameter) multimode fibers were used to collect a reasonably larger fraction of the LED output. Additionally, and perhaps even more importantly at the time, the mechanical tolerances needed to make fiber optic connectors and the corresponding receptacles on fiber optic transceivers for single mode fiber were very expensive and made them impractical for the cost sensitive short data links.

For these reasons, multimode fiber became, and to a large extent remains, the practical standard for fiber optic cabling within typical office buildings and the like. This has led to a large infrastructure of legacy multimode fiber and a corresponding desire to use this fiber for newer higher speed links.

One of the limitations on the bandwidth distance product of a multimode fiber link (that is the maximum data that can be transmitted over a given link distance), is caused by differences in propagation velocity of the different modes of a multimode fiber. These differences, usually referred to as modal dispersion, cause a pulse representing a single data bit to spread in time and interfere with adjacent pulses causing what is known as ISI or inter-symbol interference, which will degrade the quality of the received signal and ultimately cause a link to become unusable. In an ideal multimode fiber, the differences in modal velocity are very small and the bandwidth distance product is actually very high (as high as 10 GHz*km). In real fibers, however, manufacturing imperfections in the refractive index profile of the fiber lead to a much larger range of modal velocities and limit the modal bandwidth to 160-500 MHz*km depending on factors such as the optical wavelength used. One particularly common imperfection of multimode fiber index profiles is a significant peak or dip in the refractive index at the center of the fiber core, which tends to lead to large differences in the velocity of the lowest order modes relative to the remaining modes.

As the need for higher data rates in LANs and SANs increased, the problems of modal dispersion became a significant limitation. This limitation became a particular problem during the development of Gigabit Ethernet (which uses signaling rates of 1.25 Gb/s) in 1998, and threatened to significantly limit the distances. See DAVID CUNNINGHAM ET AL., GIGABIT ETHERNET NETWORKING (June 1999), incorporated herein by reference. The solution adopted for Gigabit Ethernet involved controlling the optical launch into the multimode fiber to avoid launching into modes that lead to particularly low bandwidth.

One approach to reducing modal dispersion in multimode fiber is to launch a small spot off-center into the fiber. This launches a reduced set of optical modes, and in particular tends to avoid modes which are strongly affected by imperfections in the fiber core as well as at the edges of the optical fiber. This is commonly performed by a "mode-conditioning" patch cable external to the fiber optic transceiver where the transceiver provides a single mode launch and the mode conditioning patchcord consists of a length of single mode fiber joined to a length of multimode fiber with the desired lateral offset. Unfortunately, this is a relatively expensive solution requiring additional hardware that adds an incremental cost to the optical system in which it is employed and requires an increased degree of care by the end user to make sure the patchcord is employed in links that require it.

Another approach to conditioned launch is to launch light in a ring shaped pattern where the intensity is small at the center and edges of the fiber. This general approach was standardized during the development of 10 Gigabit Ethernet to ensure usable distances on links based on 850 nm multimode laser sources. This approach specified a test of the optical power distribution at the entrance to the span of multimode fiber which set an upper bound on the power within a particular small radius and a lower bound on the power within a much large radius.

At the time of this writing, a standard is under development to allow transmission of 10 gigabit/second signals over legacy multimode fiber links with distances of up to 300 m. In this case, even with good control of the launch into the multimode fiber, the ISI is still too large for simple receivers to function well. The solution being developed in this standard is to use electronic dispersion compensation techniques in the receiver of the system to compensate for the ISI. As it turns out, even with practical degrees of electronic dispersion compensation, careful control of the launch into the fiber is still needed, and more significantly, the criteria for what is an acceptable launch is somewhat different than in the case of simpler receivers.

Another prior art approach to launching an optical signal into an optical fiber includes adding a discreet insert to a transmitter or transmitter optical subassembly (TOSA). In this approach, an optically transparent insert with a diffractive pattern is placed in the optical path in the TOSA. The diffractive element launches the optical signal with a controlled intensity and phase distribution. One particularly useful launch is one where the amplitude distribution is in a donut form and the phase varies periodically around the azimuth of the fiber. Such a launch will excite modes which travel in a helical trajectory, when thought of in the ray picture, and are particularly well suited for avoiding imperfections in the core of the optical fiber. This launch has been referred to in the literature as a "vortex launch," and an optical element which generates this launch as a "vortex lens." Further details regarding a "vortex launch" and similar methods are disclosed in U.S. Pat. No. 6,530,697 B1, filed Jun. 11, 1999, U.S. patent Publication No. US2003/0142903 A1, filed Nov. 12, 2002, and U.S. Pat. No. 6,349,159 B1, each of the foregoing being incorporated herein by reference in their entireties. More generally, the term "vortex launch" is used herein to refer to any launch which results in a substantially spiral or helical propagation in the optical fiber. The term "vortex lens" is used herein to refer to an optical element such as a diffractive surface which will generate a vortex launch. This approach has several distinct disadvantages, however. For example, the fabrication of an additional part adds an incremental cost to the TOSA. In addition to the cost of fabricating the part, there is an assembly cost in that the discreet diffractive grating part has to be carefully aligned during assembly of the TOSA. Optical systems are a very competitive industry and each such cost decreases the competitiveness of a product.

Accordingly, it would represent an advance in the art to provide less expensive methods and systems to reduce modal dispersion in existing multi-mode fibers and thereby improve the transmission of single mode optical signals over multi-mode fiber.

BRIEF SUMMARY OF THE INVENTION

The present invention relates to the use of diffractive and refractive elements to launch an optical signal with a controlled amplitude and phase distribution into a multimode optical fiber. More particularly, embodiments of the invention relate to low cost ports, transmitter optical subassemblies (TOSAs), and transceivers that use integrated diffractive and optionally refractive elements to launch an optical signal with a controlled amplitude and phase distribution into a multimode optical fiber.

Accordingly, a first example embodiment of the invention is a monolithic optical port for launching an optical signal into multimode fiber. The monolithic optical port generally includes a first surface on the optical port, the first surface comprising a diffractive surface pattern formed thereon, wherein the diffractive surface pattern is configured for receiving an optical signal and launching the optical signal into a multimode optical fiber with a controlled intensity and phase distribution.

Another example embodiment of the invention is a transmitter optical subassembly (TOSA) for converting an electrical signal into an optical signal and then coupling the optical signal to an optical fiber. The transmitter optical subassembly generally includes: a light emitter; and a monolithic optical port, the optical port comprising: a fiber receptacle, wherein an optical path is situated between the light emitter and the fiber receptacle; and a diffractive surface pattern configured for receiving an optical signal from the light emitter and launching the optical signal into an optical fiber seated in the fiber receptacle, wherein the optical signal is launched into the optical fiber with a controlled amplitude and phase distribution.

Yet another example embodiment of the invention is a transmitter optical subassembly which generally includes: an optoelectronic package comprising: a light emitter and a lens for receiving the optical signal from the laser and directing the optical signal onto an optical fiber seated in a fiber receptacle; and a transparent monolithic optical port comprising: the fiber receptacle, wherein an optical path is situated between the lens and the fiber receptacle; and a diffractive surface pattern monolithically formed with the optical port and configured for receiving an optical signal from the light emitter and launching the optical signal into a multimode optical fiber seated in the fiber receptacle, wherein the optical signal is launched into the multimode optical fiber with a controlled intensity and phase distribution.

In each of the foregoing example embodiments, the light modifying surface is preferably a diffractive optical element that launches the optical signal into the fiber in a helical or vortex distribution. In addition, the light modifying surface can be located on either the fiber-adjacent side or the light emitter adjacent side of the optical port as desired.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to the use of diffractive and refractive elements to launch an optical signal off-center into a multimode optical fiber. More particularly, embodiments of the invention relate to low cost ports, transmitter optical subassemblies (TOSAs), and transceivers that use integrated diffractive and optionally refractive elements to launch the optical signal with a controlled amplitude and phase distribution.

Reference will now be made to the figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious however, to one skilled in the art that the present invention may be practiced without these specific details. In other instances, well-known aspects of transceivers and transmitter optical subassemblies have not been described in particular detail in order to avoid unnecessarily obscuring the present invention.

Figure 1A:
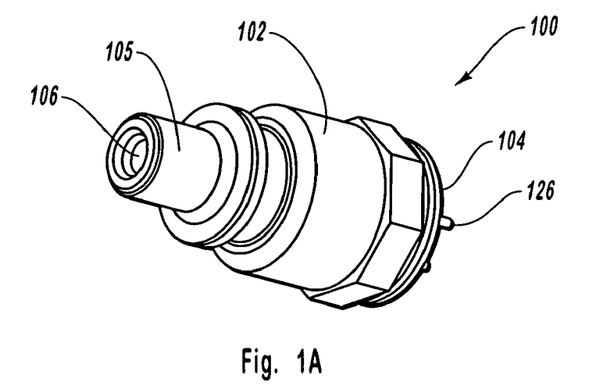
FIG. 1A illustrates a perspective view of a transmitter optical subassembly according to one embodiment of the invention.
Figure 1B:
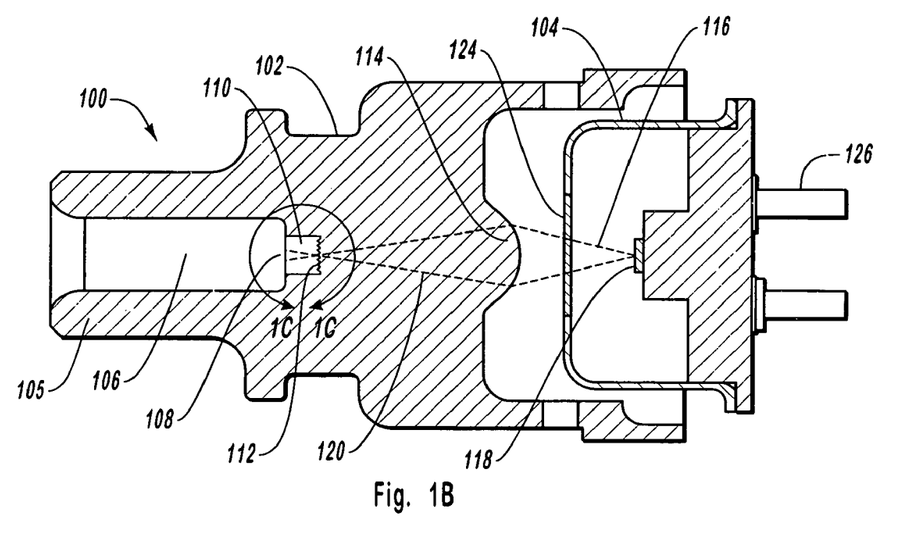
FIG. 1B illustrates a sectional view of the transmitter optical subassembly of FIG. 1A.
Figure 1C:
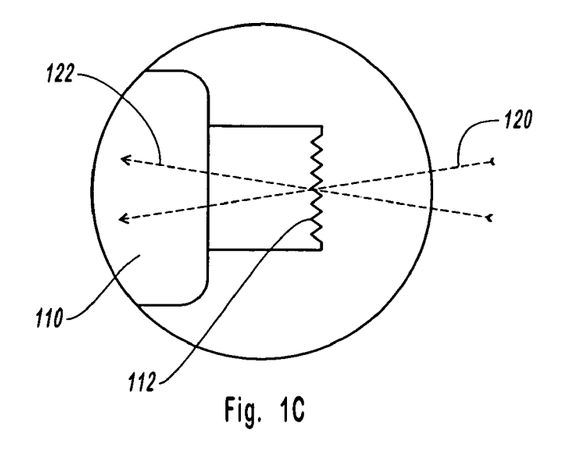
FIG. 1C illustrates a blowup view of a portion of the transmitter optical subassembly of FIG. 1A.

Referring now to FIGS. 1A-1C, one embodiment of a TOSA 100 according to the invention is therein depicted. More particularly, FIG. 1A provides a perspective view of TOSA 100, FIG. 1B provides a sectional view of TOSA 100 to show the inside of TOSA 100, and FIG. 1C provides an exploded view of one portion of TOSA 100. Embodiments of the invention are suitable for use in connection with a variety of data rates, for example as about 1 Gbps, about 2 Gbps, about 4 Gbps, and 10 about Gbps, or higher.

As best depicted in FIG. 1B, TOSA 100 generally comprises optical port 102 and an optoelectronic package such as a Transistor Outline ("TO") can 104. It should be noted that at higher data rates such as 10 gigabits per second, the normal electrical interface of a TO-can may be modified but that other features such as the overall size and manufacturing process are retained. In one embodiment, optical port 102 is an optically transparent piece of molded plastic. The optical port 102 includes a nosepiece 105 having a fiber receptacle 106 for receiving a fiber ferrule. At the end of fiber receptacle 106 is a fiber stop 108 for setting the position of the fiber ferrule. Just past fiber stop 108 is optionally an open space 110.

On the optical port surface adjacent to open space 110 but opposite fiber stop 108 is a diffractive surface 112 directly patterned into the plastic surface, as best illustrated in FIG. 1C. In other words, diffractive surface 112 is positioned on the side of the optical port 102 adjacent to the fiber receptacle. A diffractive surface is in general a microstructured pattern of reflecting or transmitting features which can be configured through the pattern, spacing and profile of its features to transform an incident amplitude and phase distribution into a very wide range of output amplitude and phase patterns. In a preferred embodiment, the diffractive surface 112 is designed to function as a vortex lens. The diffractive surface 112 is preferably a monolithic section of the optical port 102 that is formed as part of the molding process that forms the optical port 102. Diffractive surface 112 can alternatively be formed as a monolithic section of the optical port 12 by, for example, a secondary embossing process or other formation techniques known in the art. One of the key advantages of the monolithic integration of the diffractive surface into the plastic port is that it has a fixed alignment relative to the fiber receptacle 106 and thus the fiber, as well as with the refractive lens 114. This is achieved by careful positioning of the diffractive surface master within the mold for the port, and eliminates the need for active alignment of the diffractive element on a part to part basis. Alternatively, a separately formed diffractive element can also be assembled into TOSA 100 at the indicated position on optical port 102.

In another embodiment of the invention, an effectively designed refractive surface may be used in lieu of diffractive surface 112 or in lieu of other diffractive surfaces as disclosed herein. The design and implementation of refractive surfaces in optical systems is well known to those skilled in the art. Such refractive surfaces, in view of the inventive teachings and disclosure herein, can be used to achieve the launch of an optical signal into an optical fiber in a controlled amplitude and phase distribution.

Also part of optical port 102 is lens 114, which is positioned on the side of the optical port 102 adjacent to the laser, or the laser side. As with diffractive surface 112, lens 114 is preferably a molded part of optical port 102. In the depicted embodiment, diverging light 116 generated by light emitter 118 is received by lens 114 and relayed as collimated or focused light 120 to diffractive surface 112. Diffractive surface 112 bends the path of the light such that it diverges 122 and is received by a fiber seated in fiber receptacle 106 with a controlled amplitude and phase distribution. For example, in a preferred embodiment, the light can be directed to be received by the fiber to result in a vortex launch. As disclosed in FIG. 1C, as diffractive surface 112 bends the path of the light such that it diverges 122 and is received by a fiber seated in fiber receptacle 106, all rays of the resulting divergent optical signal are on respective divergent paths as the divergent optical signal enters the fiber seated in fiber receptacle 106.

Lens 114 is not necessarily implemented as an integrated part of optical port 102, however. In one variation of this and other embodiments, for example, lens 114 can be omitted in the event that a diffractive surface is positioned to receive a sufficient volume of the light emitted by light emitter 118 and modeled to effectively direct the light to the optical fiber in the desired pattern. That is, the diffractive surface can integrate the lens focusing function along with the function of producing a specific amplitude and phase distribution such as a vortex launch. In other variations of the invention, lens 114 is provided as a discreet component within TOSA 100, for example as part of the TO-can 104.

TO-can 104 is preferably a hermetically sealed structure that houses light emitter 118. Such devices are widely used in the field of optoelectronics and details regarding their construction and operation are well known to those skilled in the art. Inside TO-can 104 is a light emitter 118. Light emitter 118 is preferably a laser diode such as a vertical cavity surface emitting laser (VCSEL), a Fabry-Perot Laser, or a distributed feedback (DFB) laser. Of course other light emitters capable of generating an optical signal at the required modulation rates may be compatible with various embodiments of the invention.

Another part of TO-can 104 is an optically transparent can window 124 that is positioned to permit passage therethrough of light from light emitter 118 to optical port 102, more specifically for example to lens 114. TO-can also includes structures to enable the TO-can to communicate power and electrical signals with other electronic structures. For example, pins 126 are configured for this purpose. It should be noted that other electrical interfaces to the TO-can are commonly employed for higher data rates such as 10 gigabits per second.

In summary, in order for TOSA 100 to launch an optical signal into an optical fiber seated in fiber receptacle 106, an electrical signal is communicated to the TOSA 100 through pins 126. Electronic circuitry in TO-can 104 directs light emitter 118 to generate an optical signal. The optical signal diverges as it is emitted and passes through can window 124 and reaches optically transparent optical port 102. A molded lens in optical port 102 preferably receives the optical signal and directs it towards the optical fiber. Before the signal reaches the optical fiber, however, the optical signal is redirected by diffractive surface 112 so that the optical signal is launched into the optical fiber in a controlled amplitude and phase distribution.

Figure 2:
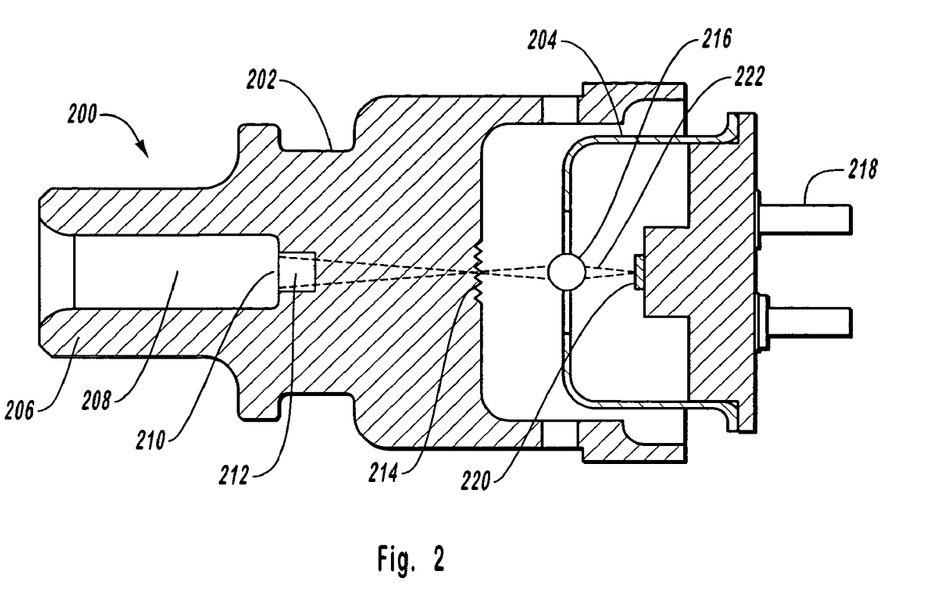
FIG. 2 illustrates a sectional view of another transmitter optical subassembly according to yet another embodiment of the invention.

Referring now to FIG. 2, another embodiment of a TOSA 200 according to the invention is depicted. Similar to TOSA 100 in FIGS. 1A-1C, TOSA 200 includes an optical port 202 and a TO-can 204. Optical port 202 includes nosepiece 206, fiber receptacle 208, fiber stop 210, and open space 212, each as described above with respect to optical port 102. In contrast to the illustrated optical port 102, however, this embodiment includes diffractive surface 214 on the laser side of the optical port 202, not the fiber side, and omits the lens from its molded construction.

In the depicted embodiment, a lens 216 is positioned where can window 124 is positioned in a hermetically sealed TO-can 104. In the depicted embodiment lens 216 is a ball lens. Thus, lens 216 is in the optical path of the optical signal generated by light emitter 220. Of course, as with the previously discussed embodiments, the lens can be either omitted or positioned in different locations in the TOSA. For example, lens 216 could be positioned further inside the TO-can 204 or between TO-can 204 and optical port 202, if desired. A variety of different lens structures could be used in this or other embodiments of the invention, including for example: ball lenses, conventional lenses with spherical surfaces, aspheric lenses, or very low cost lenses formed by the thermal reflow of a glass shot. In addition, a microlens assembly as disclosed in U.S. Patent Provisional Application No. 60/483,740, filed Jun. 30, 2003, incorporated herein by reference in its entirety, can also be suitably employed with embodiments of the invention.

TO-can 204 is also structured generally similarly to TO-can 104 except that, in this example, an optional lens 216 is incorporated in TO-can 204. As previously mentioned, lens 216 is positioned where can window 124 is positioned in TO-can 104.

Accordingly, in operation an electrical signal is relayed to TO-can 204 via pins 218. The electrical signal is converted to an optical signal 222 by light emitter 220. This optical signal 222 diverges as it leaves the light emitter 220 and is then optionally received by lens 216. Lens 216 relays the optical signal onto diffractive surface 214 as a converging or collimated optical signal. As previously discussed, diffractive surface 214 next launches the optical signal onto an optical fiber seated in fiber receptacle 208 with a controlled amplitude and phase distribution. As disclosed in FIG. 2, as diffractive surface 214 launches the optical signal onto an optical fiber seated in fiber receptacle 208, all rays of the resulting divergent optical signal are on respective divergent paths as the divergent optical signal enters the optical fiber seated in fiber receptacle 208.

Figure 3:
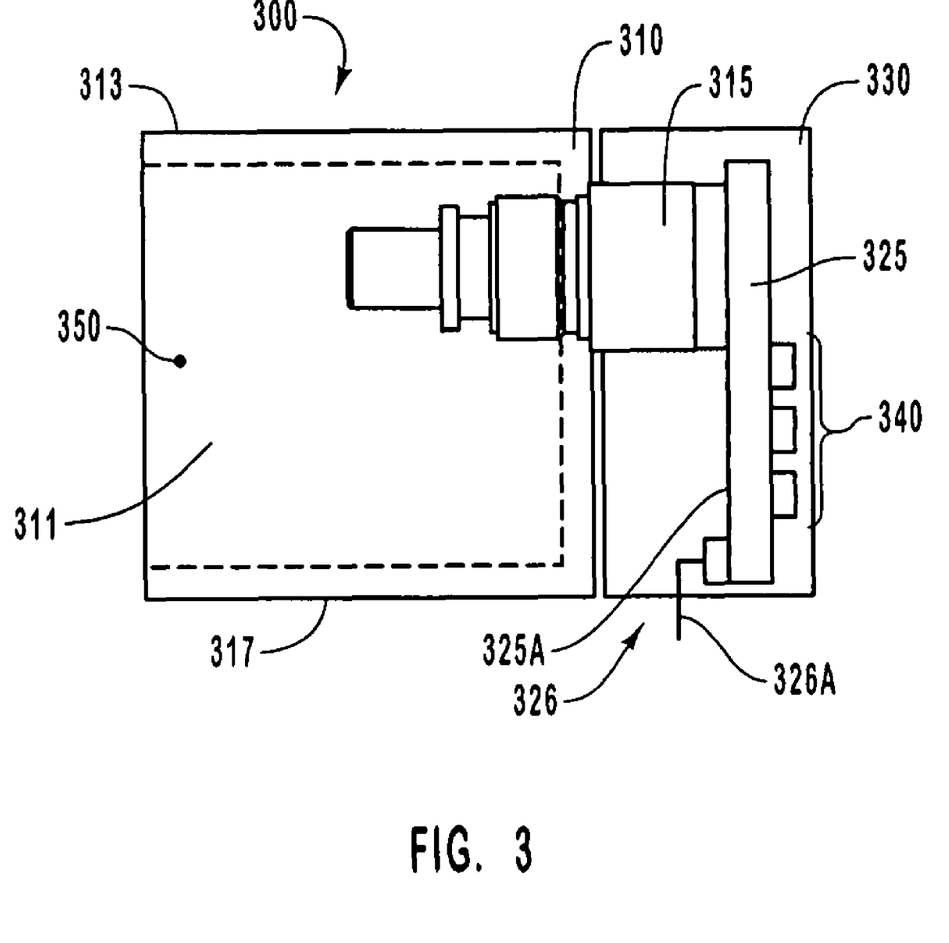
FIG. 3 illustrates a side view of an optical transceiver according to one embodiment of the invention.

Turning now to FIG. 3, details are provided concerning the use of an exemplary optical transceiver 300 in various exemplary operating environments. In particular, FIG. 3 is a side view of the optical transceiver 300 having a housing 310 that includes a pair of opposing vertical walls (only wall 311 is depicted) as well as a top cover 313 and bottom cover 317. TOSA 315 is designed in line with the embodiments of the invention as disclosed herein and therefore includes diffractive and/or refractive surfaces to launch an optical signal with a controlled amplitude and phase distribution into an optical fiber. A ROSA is also included in transceiver 300 but is not depicted as it is positioned behind TOSA 315.

Exemplary implementations of the transceiver substrate 325 include various components, circuits and devices 340 which are mounted to the transceiver substrate. The transceiver substrate 325 also includes a connector 326 exemplarily implemented as an array of electrical connection pins 326A.

Similar to housing 310, the housing 330 includes a pair of opposing vertical walls as well as a top cover and a bottom cover. In some implementations, the housings 310 and 330 are integrated with each other so that a single housing is defined. As further indicated in FIG. 3, the housing 310 further defines a cavity 350 wherein the TOSA 315 and ROSA are substantially disposed. In general, the cavity 350 at least partially defines a receptacle for receiving a fiber optic connector to be attached to one or both of the TOSA 315 and the ROSA. Various types of types of optical cable interfaces can be used in optical transceivers according to the invention.

Figure 4:
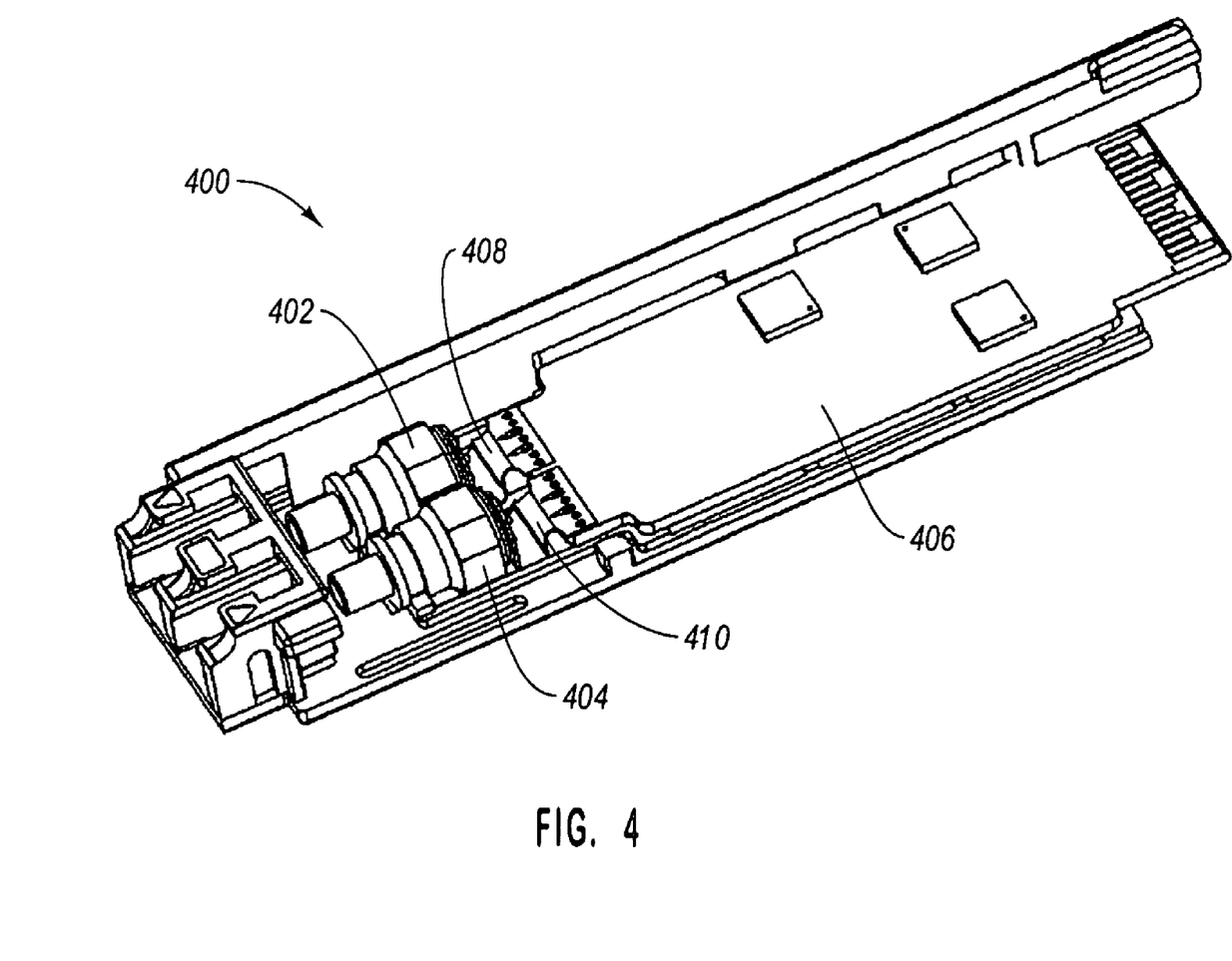
FIG. 4 illustrates another optical transceiver according to one embodiment of the invention.

As part of ongoing efforts to reduce the size of optical transceivers and other components, manufacturing standards such as the small form factor ("SFF"), small form factor pluggable ("SFP"), and 10-gigabit small form factor pluggable ("XFP") standards have been implemented in the industry. With reference to FIG. 4, the depicted transceiver module 400 is an XFP transceiver module, which is a 10-Gigabit XFP Form-Factor Pluggable Module for use in telecommunications networks, local area networks, metro area networks, storage area networks, wide area networks, and the like. It will appreciated by those skilled in the art that this is simply one compatible design for an optical transceiver, and other transceiver designs can incorporate aspects of the invention to launch an optical signal off-center into a multimode optical fiber. XFP transceivers are designed to occupy one-fifth of the space and dissipate one-half the power of prior 10 Gb/s modules. The transceiver modules constructed according to the invention can be compatible with the XFP MSA standards, for example including those set forth in the 10 Gigabit Small Form Factor Pluggable Module adoption draft specification Revision 4.0 published by the XFP Multi Source Agreement (MSA) Group on Apr. 13, 2004 (xfpmsa.org), which is incorporated herein by reference, and can also be compatible with future revisions or final XFP MSA specifications that will be adopted in the future.

As depicted in FIG. 4, XFP transceiver module 400 includes TOSA 402 for generating an optical signal based on a received electrical input and receiver optical subassembly ("ROSA") 404 for receiving an optical signal and generating an electrical output to relay the signal. TOSA 402 is designed in line with the embodiments of the invention as disclosed herein and therefore includes diffractive and/or refractive surfaces to launch an optical signal off-centered into an optical fiber.

ROSA 404 may include, for example, a PIN photodiode for converting an optical signal received by ROSA 404 into an electrical signal. Of course, optical receivers that are compatible with embodiments of the invention may use other forms of photodiodes.

Within a transceiver module, each optical subassembly generally includes electrical connections to various additional components such as a transceiver substrate, sometimes embodied in the form of a printed circuit board ("PCB"). Accordingly, FIG. 4 depicts PCB 406, first flexible circuit 408 and second flexible circuit 410 for relaying electrical signals.

The depicted flexible circuits 408, 410 are an optional method to communicate electrical signals to and from the TOSA 402 and ROSA 404 to PCB 406 in the transceiver module 400. First flexible circuit 408 interconnects TOSA 402 and PCB 406 while second flexible circuit 410 interconnects ROSA 404 and PCB 406. In addition, the depicted embodiment uses pins for connecting TOSAs and ROSAs to the flexible circuits. Further details regarding the use of flexible circuits in optical transceivers are provided in U.S. patent application Ser. No. 10/409,837, filed Apr. 9, 2003, incorporated herein by reference in its entirety.

The PCB can include multiple active circuitry components particularly designed to drive or handle electrical signals sent to or returning from one or more of the electrically-attached TOSAs and ROSAs. Accordingly, such a PCB will usually include a number of electrical transmission lines with the one or more TOSAs and ROSAs. Such connections may include "send" and "receive" data transmission lines for each TOSA and ROSA, one or more power transmission lines for each TOSA and ROSA, and one or more diagnostic data transmission lines for each TOSA and ROSA.

Other components of a transceiver module may include a bail release and LC cable receptacles for receiving and securely attaching LC cables to each of TOSA 402 and ROSA 404.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical port, the optical port comprising:
a fiber receptacle; and
a two-surfaced optically transparent solid piece of molded material monolithically integrated with the fiber receptacle, the first surface comprising a refractive lens, the second surface comprising a diffractive surface, the refractive lens configured to receive and bend a divergent optical signal into a convergent optical signal that passes through the optically transparent solid piece of molded material toward the diffractive surface, all rays of the convergent optical signal being on respective convergent paths, the diffractive surface configured to receive and bend the convergent optical signal into a second divergent optical signal that is output from the diffractive surface into the fiber receptacle, wherein all rays of the second divergent optical signal are on respective divergent paths as the divergent optical signal enters the fiber receptacle.

2. An optical port as defined in claim 1, wherein the first surface is adjacent a lens or light emitter.

3. An optical port as defined in claim 1, wherein the optical port comprises molded plastic and the diffractive surface comprises a molded surface.

4. An optical port as defined in claim 1, wherein the fiber receptacle comprises a molded fiber receptacle configured to receive an optical fiber.

5. An optical port as defined in claim 1, wherein the second divergent optical signal has a controlled amplitude and phase distribution.

6. An optical port as defined in claim 5, wherein the diffractive surface comprises a vortex lens.

7. An optical transceiver comprising an optical port as defined in claim 1.

8. An optical port as defined in claim 1, wherein a fiber stop is defined at an end of the fiber receptacle.

9. An optical port as defined in claim 8, wherein the optical port further comprises an open space positioned between the fiber stop and the diffractive surface, the open space having a diameter that is less than a diameter of the fiber receptacle.

10. A transmitter optical subassembly, comprising:
a light emitter; and
a monolithic optical port, the optical port comprising:
a fiber receptacle; and
a two-surfaced optically transparent solid piece of molded material monolithically integrated with the fiber receptacle and positioned between the light emitter and the fiber receptacle, the first surface comprising a refractive lens, the second surface comprising a diffractive surface, the refractive lens configured to receive and bend a divergent optical signal from the light emitter into a convergent optical signal that passes through the optically transparent solid piece of molded material toward the diffractive surface, all rays of the convergent optical signal being on respective convergent paths, the diffractive surface configured and arranged to receive and bend the convergent optical signal to produce a second divergent optical signal and to launch the second divergent optical signal off-center into an optical fiber seated in the fiber receptacle such that all rays of the second divergent optical signal are on respective divergent paths as the divergent optical signal enters the optical fiber.

11. A transmitter optical subassembly as defined in claim 10, wherein the optical port comprises molded optically transparent plastic.

12. A transmitter optical subassembly as defined in claim 10, wherein an amplitude and phase distribution of the launched signal takes the form of an annulus.

13. A transmitter optical subassembly as defined in claim 12, wherein the amplitude and phase distribution comprise a vortex launch.

14. A transmitter optical subassembly as defined in claim 10, wherein the light emitter is housed within a hermetically sealed TO-can.

15. A transmitter optical subassembly as defined in claim 10, wherein the light emitter is configured to emit at the 1310 nm channel.

16. A transmitter optical subassembly as defined in claim 10, wherein the light emitter is selected from the group consisting of a vertical cavity surface emitting laser (VCSEL), a Fabry-Perot Laser, and a distributed feedback (DFB) laser.

17. An optical transceiver comprising the transmitter optical subassembly as defined in claim 10 and a receiver optical subassembly.

18. A transmitter optical subassembly as defined in claim 10, wherein a fiber stop is defined at an end of the fiber receptacle.

19. A transmitter optical subassembly as defined in claim 18, wherein the optical port further comprises an open space positioned between the fiber stop and the diffractive surface, the open space having a diameter that is less than a diameter of the fiber receptacle.

20. A transmitter optical subassembly comprising:
an optoelectronic package comprising a hermetically sealed structure that houses a light emitter, the hermetically sealed structure including an optically transparent window; and
an optical port comprising an optically transparent piece of molded plastic, the optical port defining a fiber receptacle configured to receive an optical fiber, the optical port defining an opening into which the optoelectronic package is received, the optical port defining a solid optical path of transparent molded plastic positioned between the receptacle and the opening, the solid optical path of transparent molded plastic having a refractive lens formed on a first surface adjacent the optically transparent window, the solid optical path of transparent molded plastic having a diffractive surface formed on a second surface adjacent the fiber receptacle, wherein the light emitter is configured to produce and direct a first divergent optical signal through the optically transparent window to the refractive lens, all rays of the first divergent optical signal being on respective divergent paths, the refractive lens configured to bend the first divergent optical signal into a convergent optical signal and direct the convergent optical signal through the solid optical path of transparent molded plastic to the diffractive surface, all rays of the convergent optical signal being on respective convergent paths, the diffractive surface configured to bend the convergent optical signal into a second divergent optical signal and launch the second divergent optical signal into an optical fiber seated in the fiber receptacle, and all rays of the second divergent optical signal being on respective divergent paths.

21. A transmitter optical subassembly as defined in claim 20, wherein the optoelectronic package comprises a TO-can.

22. A transmitter optical subassembly as defined in claim 20, wherein an intensity and phase distribution associated with the launched signal take the form of an annulus.

23. A transmitter optical subassembly as defined in claim 20, wherein an amplitude and phase distribution associated with the launched signal comprises a vortex launch.

24. A transmitter optical subassembly as defined in claim 20, wherein the light emitter is configured to emit at the 1310 nm channel.

25. A transmitter optical subassembly as defined in claim 20, wherein the light emitter is selected from the group consisting of a vertical cavity surface emitting laser (VCSEL), a Fabry-Perot Laser, and a distributed feedback (DFB) laser.

26. An optical transceiver comprising a transmitter optical subassembly as defined in claim 20.

27. A transmitter optical subassembly as defined in claim 20, wherein the optical port further defines a fiber stop at an end of the fiber receptacle.

28. A transmitter optical subassembly as defined in claim 27, wherein the optical port further defines an open space positioned between the fiber stop and the diffractive surface, the open space having a diameter that is less than a diameter of the fiber receptacle.

* * * * *